No. 781,428. PATENTED JAN. 31, 1905.
S. J. & L. A. HUTCHINS.
INHALER, INJECTOR, AND MEDICATOR.
APPLICATION FILED JULY 28, 1904.

WITNESSES
M. M. Innis
M. Hagerty

INVENTORS
SHERIDAN J. HUTCHINS
LOREN A. HUTCHINS
BY Paul & Paul
THEIR ATTORNEYS

No. 781,428.
Patented January 31, 1905.

UNITED STATES PATENT OFFICE.

SHERIDAN J. HUTCHINS AND LOREN A. HUTCHINS, OF ST. PAUL, MINNESOTA.

INHALER, INJECTOR, AND MEDICATOR.

SPECIFICATION forming part of Letters Patent No. 781,428, dated January 31, 1905.

Application filed July 28, 1904. Serial No. 218,452.

*To all whom it may concern:*

Be it known that we, SHERIDAN J. HUTCHINS and LOREN A. HUTCHINS, of St. Paul, Ramsey county, Minnesota, have invented certain new and useful Improvements in Inhalers, Injectors, and Medicators, of which the following is a specification.

The object of our invention is to provide a device adapted to be carried in the pocket and designed for use in the treatment of various kinds of nasal and throat diseases, particularly those of a catarrhal nature.

The invention consists generally in various constructions and combinations, all as hereinafter described, and particularly pointed out in the claims.

Figure 1:
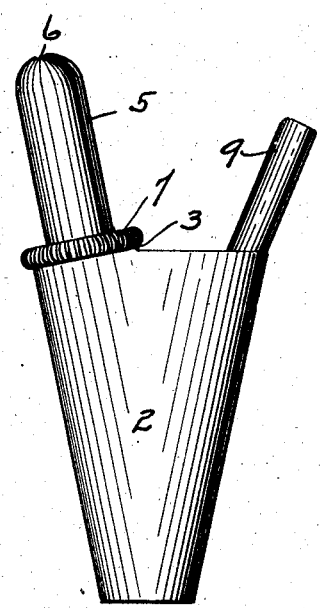
Figure 2:
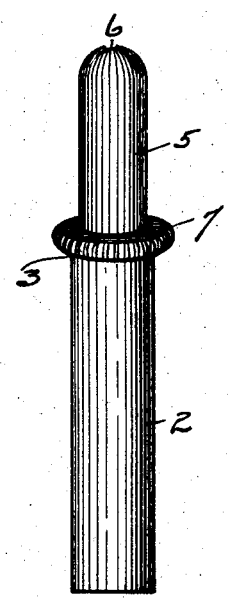
Figures 3, 4:
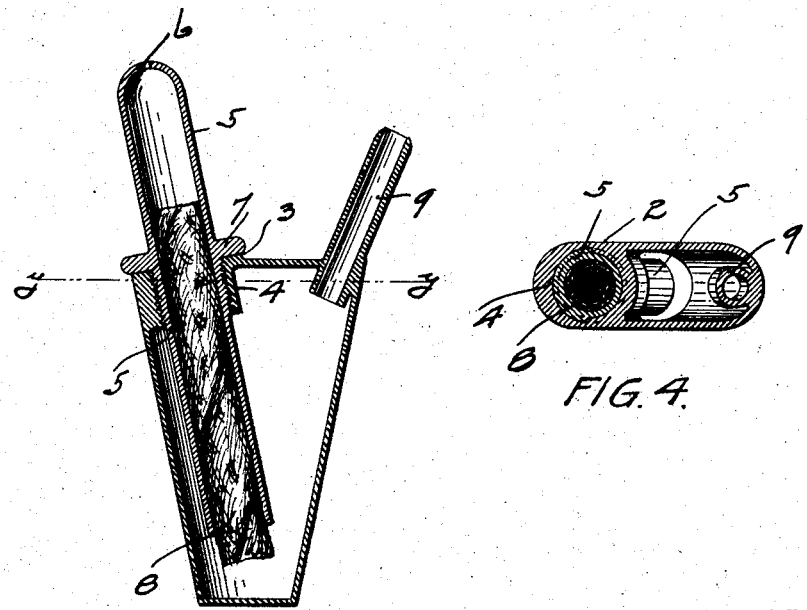

In the accompanying drawings, forming part of this specification, Figure 1 is a side elevation of an injector, inhaler, and medicator embodying our invention. Fig. 2 is an edge view of the same. Fig. 3 is a vertical section. Fig. 4 is a horizontal section on the line $y$ $y$ of Fig. 3.

In the drawings, 2 represents the casing or main portion of the device flattened in form, as shown in Fig. 2, to permit the device to be carried conveniently in the vest-pocket and tapered from the top toward the bottom, for the purpose hereinafter described. The upper edge of the casing 2 has an opening 3, surrounded by an interiorly-threaded sleeve 4 and adapted to receive an exteriorly-threaded tube 5, having an open lower end and a rounded upper end adapted to be inserted into the nose and provided with a discharge-orifice 6. A flange 7 is formed integrally on said tube above its threaded portion and is adapted to engage the top of the casing and limit the downward movement of the tube therein. Within the tube we place a porous substance 8, suitably medicated, according to the disease for which the device is to be used, and this substance preferably protrudes below the open end of the tube, as shown in Fig. 3. A mouthpiece 9 is provided in the upper end of the casing opposite the tube 5 and with said tube converges slightly toward the bottom of the casing to conform substantially to the taper of its walls. Upon placing the tube 9 in the mouth and blowing therein a blast of air will be directed to the bottom of the casing and up through the medicated substance and into the nostril. The taper of the walls of the casing serve to concentrate the air-blast, increasing the effectiveness of the said blast at the orifice 6 and increasing the efficiency of the device. The edge of the flange 7 is preferably milled for convenience in removing the tube for cleansing purposes or to saturate the substance 8 with a fresh supply of the nasal or throat disease remedy.

We claim as our invention—

1. A device of the class described, comprising a flattened shell or casing tapered from the top toward the bottom, a mouthpiece provided at the top of said casing, a nasal tube also at the top of said casing opposite said mouthpiece and containing a medicated substance, and said mouthpiece and tube converging toward the bottom of said casing in conformity to the taper thereof, substantially as described.

2. The combination, with a shell or casing having a mouthpiece in one end and an opening in the same end, and an interiorly-threaded sleeve surrounding said opening, of an exteriorly-threaded nasal tube fitting within said sleeve and having an open inner end adapted to receive a medicated substance, and a shoulder engaging said sleeve to limit the inward movement of said tube.

3. The combination, with a casing tapered from its upper toward its lower end and provided with a mouthpiece on one side, of a nasal tube removably fitting an opening in the upper end of said casing and having an open inner end to receive a medicated substance, the said mouthpiece and nasal tube converging toward the lower end of said casing in conformity substantially to the taper of said casing.

In witness whereof we have hereunto set our hands this 25th day of July, 1904.

SHERIDAN J. HUTCHINS.
LOREN A. HUTCHINS.

In presence of—
E. J. HEIMBACH,
SILAS E. FOREMAN.